United States Patent [19]

Kawakami et al.

[11] Patent Number: 4,553,186

[45] Date of Patent: Nov. 12, 1985

[54] TAPE DRIVE MEMBER AND MANUFACTURING METHOD FOR THE SAME

[75] Inventors: Hiroshi Kawakami, Fujisawa; Shigeyoshi Torii, Kawasaki, both of Japan

[73] Assignee: Tokyo Shibaura Denki Kabushiki Kaisha, Kawasaki, Japan

[21] Appl. No.: 414,358

[22] PCT Filed: Dec. 14, 1981

[86] PCT No.: PCT/JP81/00378

§ 371 Date: Aug. 13, 1982

§ 102(e) Date: Aug. 13, 1982

[87] PCT Pub. No.: WO82/02110

PCT Pub. Date: Jun. 24, 1982

[30] Foreign Application Priority Data

Dec. 15, 1980 [JP] Japan ............................. 55-176846

[51] Int. Cl.⁴ ................... G11B 15/28; G11B 15/60; B65H 17/20
[52] U.S. Cl. ............................. 360/130.21; 226/193; 360/93
[58] Field of Search ............. 360/130.21, 84, 128, 360/130.2, 130.3, 130.31, 71, 90, 122, 125, 93; 226/193, 197, 198, 199; 242/75

[56] References Cited

U.S. PATENT DOCUMENTS

| | | |
|---|---|---|
| 3,141,593 | 7/1964 | Selsted .................. 226/193 |
| 3,445,116 | 5/1969 | Knox ................. 360/130.21 |
| 3,919,717 | 11/1975 | Cullen .................... 360/125 |
| 4,163,266 | 7/1979 | Tatamura ................ 360/84 |
| 4,307,427 | 12/1981 | Kawachi ................ 360/128 |
| 4,310,863 | 1/1982 | Lelandais ............... 226/189 |

FOREIGN PATENT DOCUMENTS

| | | |
|---|---|---|
| 2847493 | 5/1980 | Fed. Rep. of Germany . |
| 36-22312 | 8/1961 | Japan . |
| 39-25673 | 11/1964 | Japan . |
| 48-8249 | 3/1973 | Japan . |
| 49-16343 | 4/1974 | Japan . |
| 49-15204 | 4/1974 | Japan . |
| 52-211010 | 1/1977 | Japan . |
| 53-95836 | 8/1978 | Japan . |
| 54-35139 | 3/1979 | Japan . |
| 54-35831 | 3/1979 | Japan . |

Primary Examiner—Robert M. Kilgore
Attorney, Agent, or Firm—Cushman, Darby & Cushman

[57] ABSTRACT

A method for manufacturing a tape drive member is provided which comprises forming a shaft from an alloy of a soft metal material and a hard metal material, subjecting part of the shaft to sand blasting for roughening, and chemically treating the roughened surface in a solution which is capable of dissolving the soft metal material. A tape drive member manufactured by this method is also provided.

5 Claims, 16 Drawing Figures

TAPE DRIVE MEMBER AND MANUFACTURING METHOD FOR THE SAME

BACKGROUND OF THE INVENTION

1. Technical Field

The present invention relates to a tape drive member suitably adapted as a capstan of, for example, a tape recorder and to a manufacturing method for the same, and more particularly, to a tape drive member which is capable of driving a tape in a stable and reliable manner.

2. Background Art

Figure 1:
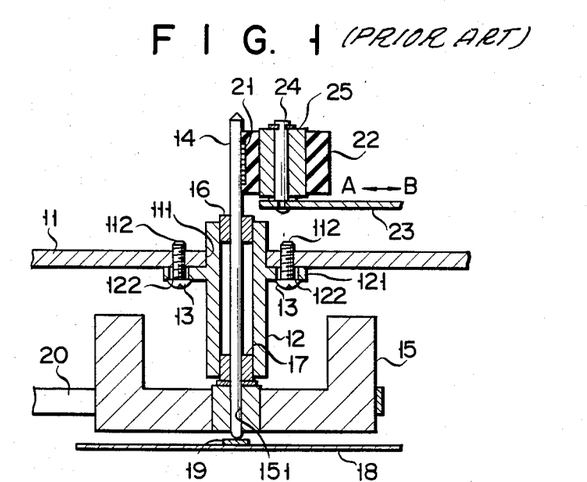
FIGS. 1, 2a and 2b are side sectional view, top view and side view, respectively showing the mounting step of a capstan and the mode of operation thereof.

As is well known, a capstan of a tape recorder as an example of a tape drive member is supported in the manner shown in FIG. 1. Referring to FIG. 1, reference numeral 11 denotes a main chassis of a tape recorder which has a through-hole 111, formed at a predetermined position thereof, through which extends a support cylinder 12. A flange 121 is formed substantially midway along the support cylinder 12. Screws 13 are respectively inserted into through-holes 122 and threadably engage with screw holes 112 formed in the main chassis 11. In this manner, the support cylinder 12 is fixed onto the main chassis 11.

A capstan 14 extends through the support cylinder 12. The capstan 14 rotates with a flywheel 15 since its lower portion is inserted and fixed in a through-hole 151 formed at the center of rotation of the flywheel 15. The capstan 14 is supported by support members 16 and 17 which are arranged at the upper and lower ends, respectively, of the support cylinder 12 so that the capstan 14 may rotate smoothly without jolting. The lower end of the capstan 14 is in contact with a bearing 19 of a subchassis 18 which is arranged substantially parallel to the main chassis 11. The flywheel 15 is coupled through a belt 20 to a motor (not shown) to be driven thereby.

Figure 2:
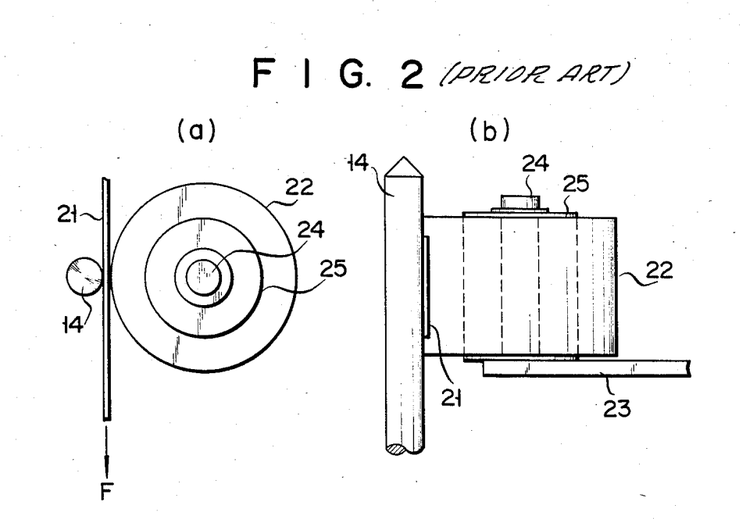

A pinch roller 22 is urged against the upper portion (FIG. 1) of the capstan 14 in putting a tape 21 therebetween. The pinch roller 22 is rotatably mounted through a support member 26 on a shaft 24 extending from a slider 23 which is slidable in the directions indicated by arrows A and B in synchronism with the operation of a tape constant speed drive member (not shown). In the tape drive stop state, the rotational force of the motor as described above is transmitted to the flywheel 15 and the capstan 14, which rotate stably. However, since the slider 23 has been moved in the direction indicated by arrow B and the pinch roller 22 is separated from the capstan 14, the tape 21 is not driven. When the tape constant speed drive member is operated in the tape drive state, the slider 23 is synchronously slid in the direction indicated by arrow A. Then, the pinch roller 24 is urged against the rotating capstan 14 in putting the tape 21 therebetween, as shown enlarged in FIGS. 2(a) and 2(b), and the tape 21 is driven.

The driving force F for driving the tape 21 by the capstan 14 may be approximately given by the following equation:

$$F = (\mu 1 + \mu 2) P$$

where
- $\mu 1$ is the friction coefficient between the tape 21 and the pinch roller 22;
- $\mu 2$ is the friction coefficient between the tape 21 and the capstan 14; and
- P is the pinching force acting on the tape 21.

It may be seen from this equation that, if the pinching force P remains constant, the friction coefficients $\mu 1$ and $\mu 2$ must be increased in order to obtain a greater driving force F, thereby driving the tape 21 in a stable and reliable manner.

Meanwhile, the portion of the capstan 14 which is supported by the support cylinder 12 through the support members 16 and 17 preferably cause low friction to ensure smooth rotation. On the other hand, the tape driving portion of the capstan 14 to which the pinch roller 22 is urged must have a high friction coefficient.

Figure 3:
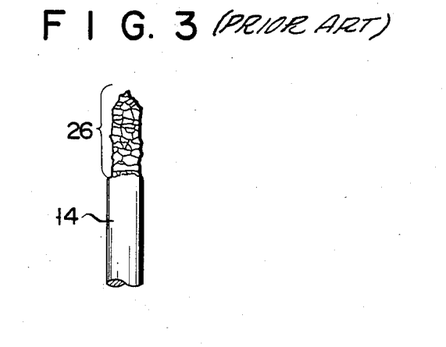
FIGS. 3 and 4 are enlarged side and top views respectively showing a conventional capstan.

For this reason, a conventional capstan 14 is made of stainless steel which is ternary alloy of iron (Fe), chrome (Cr) and nickel (Ni) as major components to have a smooth surface with a small friction coefficient. The tape driving portion of the capstan 14 which will be brought into contact with the tape 21 is treated by sand blasting or the like. According to the sand blasting treatment, fine hard particles (e.g., of a ceramic) are collided at high speed against the tape driving portion of the capstan 14 so as to abrade the tape driving portion to a rough surface 26 as shown in FIG. 3. When the pinch roller 22 is urged against the rough surfaced tape driving portion 26 of the capstan 14 in putting the tape 21 therebetween, the friction coefficient $\mu 1$ between the tape 21 and the pinch roller 22 and the friction coefficient $\mu 2$ between the tape 21 and the capstan 14 are increased, so that a greater driving force F is obtained.

Figure 5:
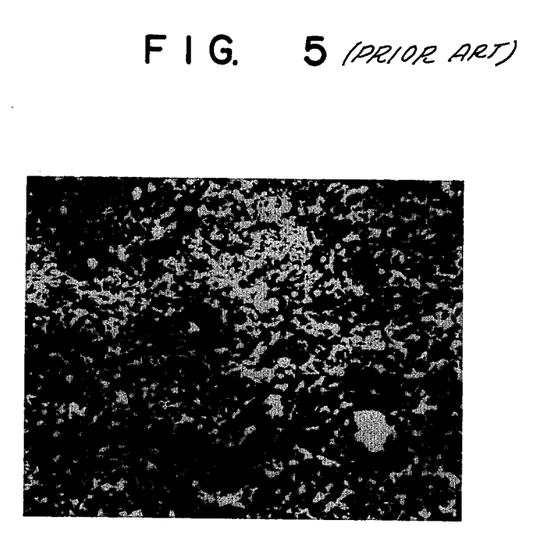
FIG. 5 is a microphotograph of a conventional capstan.

However, the conventional tape drive member and the method for manufacturing the same as described above are subject to drawbacks to be described below. The surface of the capstan 14 which has been treated by sand blasting has fine cracks or distortion as seen in the microphotograph (1,000 magnification) shown in FIG. 5. Therefore, the cracked or distorted part of the capstan 14 becomes worn down by the tape 21 with frequency of use. Then, the driving force F is weakened, and the initial performance cannot be maintained for a prolonged period of time, resulting in poor durability. The respective components of iron, chrome and nickel as described above are randomly exposed to the surface of the capstan which was treated by sand blasting. Since iron is softer than chrome, nickel or the like, it is worn out more quickly upon contact with tape 21, also resulting in poor durability. As described above, fine hard particles are collided against the tape drive portion of the capstan 14. Therefore, as shown in FIG. 3, the diameter of the rough surface portion 26 of the capstan 14 which has been subjected to sand blasting is smaller than the remaining portion of the capstan 14 which was not subjected to sand blasting. Consequently, the rough surface portion 26 becomes eccentric with respect to the axis of the remaining portion of the capstan 14.

SUMMARY OF THE INVENTION

The present invention has been made in consideration of the above-mentioned drawbacks and has for its object to provide a tape drive member which is capable of driving a tape in a stable and reliable manner and which is excellent in durability, and to a method for manufacturing the same.

A tape drive member of the present invention is made of alloy of a soft metal material and a hard metal material, and has a rough surface portion devoid of fine cracks and distortion around it.

According to the method for manufacturing of the tape drive member of the present invention, a tape drive member is made of alloy of soft and hard metal materials, the surface of the drive member is roughened, and the roughened surface is subjected to a finishing treatment.

DETAILED DESCRIPTION OF THE PREFERRED EMBODIMENT

Figure 4:
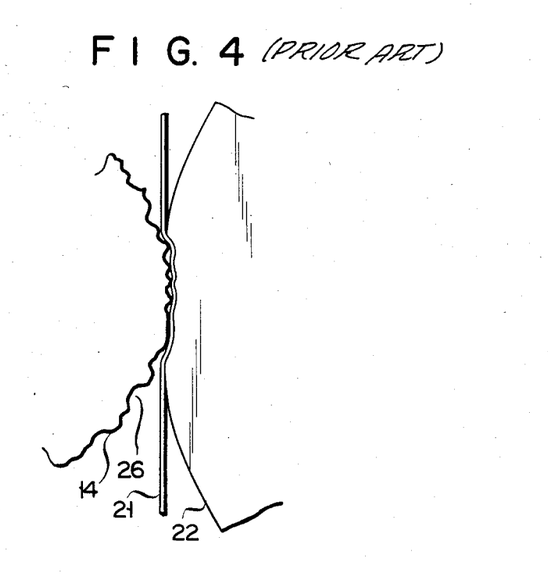
Figure 6:
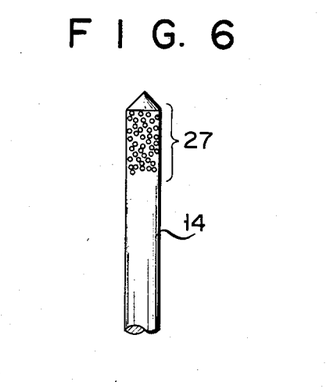
FIGS. 6 and 7 are side and top views respectively showing a tape drive member and a method for manufacturing the same according to one embodiment of the present invention.
Figure 7:
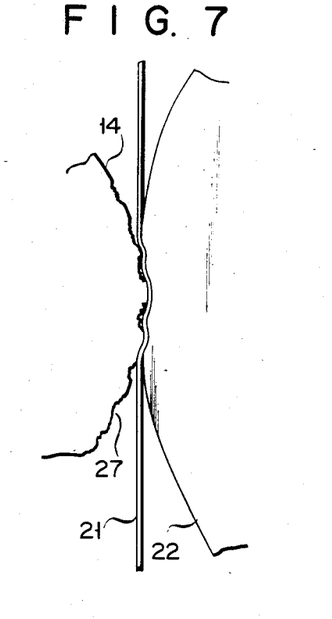

One embodiment of the present invention will now be described in detail with reference to the accompanying drawings. Referring to FIGS. 6 and 7, the same reference numerals as in FIGS. 3 and 4 denote the same parts. The capstan 14 is made of a soft metal material such as iron (Fe) and hard metal materials such as chrome (Cr) and nickel (Ni). The tape drive part of the capstan 14 which will be brought into contact with the tape 21 is roughened by, for example, sand blasting, and is then mechanically polished to form a rough surface portion 27 devoid of fine cracks and distortion, the axis of the rough surface portion 27 being in alignment with the rotating axis of the capstan 14.

As shown enlarged in FIG. 7, with the capstan 14 described above, the friction coefficient $\mu 1$ between the tape 21 and the pinch roller 22 and the friction coefficient $\mu 2$ between the tape 21 and the capstan 14 may be made great provided that the pinch roller 22 is urged against the capstan 14 in putting the tape 21 therebetween. As a result, a greater tape driving force F may be obtained, and fine cracks and distortion may be prevented. Therefore, even if the capstan 14 is used for a long period of time, the initial driving force may be maintained and the durability may be improved.

If the soft metal material such as iron is located in the recessed portion of the roughened surface portion 27, and the hard metal materials such as chrome and nickel are located at the projecting portion thereof, the tape drive portion of the capstan 14 which will be brought into direct contact with the tape 21 may be entirely made of the hard metal materials, resulting in still better durability.

Figure 8:
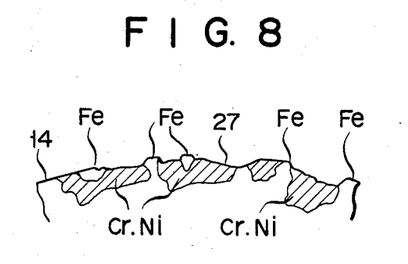
FIGS. 8 and 9 are side and characteristic graph respectively showing the positional relationship and component ratio of iron, chrome and nickel at the surface of the capstan after being subjected to a polishing finish according to the embodiment shown in FIGS. 6 and 7.
Figure 9:
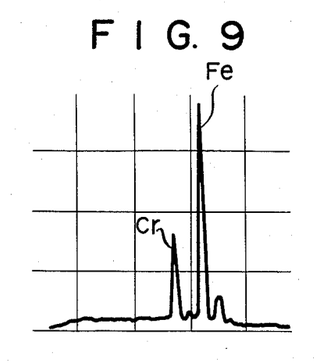

A method for causing iron to be located in the recessed portion of the rough surface portion 27 and chrome and nickel at the projecting portion thereof will now be described. According to this method, the surface of the tape drive portion of the capstan 14 is subjected to sand blasting and a polishing finish as described above, and is chemically activated to cause reaction with an acid and to dissolve mainly the iron component. More specifically, in the surface of the tape drive portion of the capstan 14, after it is subjected to sand blasting and a polishing finish, iron (Fe), chrome (Cr) and nickel (Ni) are randomly exposed, as shown in FIG. 8. The ratio of the iron to chrome components per unit area in this condition is as shown in FIG. 9. FIG. 9 shows the ratio of iron and chrome components as analyzed by an X-ray microanalyzer. It is seen from FIG. 9 that the iron content is significantly greater than the chrome content.

Figure 10:
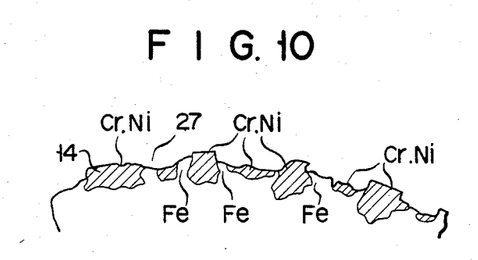
FIG. 10 is a side view showing the positional relationship among iron, chrome and nickel at the surface of the cap stand after being chemically treated according to the embodiment shown in FIGS. 6 and 7.

When the surface of the capstan 14 under this condition is chemically activated to cause reaction with an acid and to dissolve the iron component, iron remains only in the recessed parts of the roughened surface portion 27 of the capstan 14 while the chrome and nickel components remain on the projecting parts thereof, as shown in FIG. 10.

A method for chemically treating the surface of the capstan 14 will now be described. The capstan 14 which is subjected to sand blasting and a polishing finish is chemically treated in the order shown below:

1. Degreasing

The capstan 14 is cleaned with trichlene to remove oil contents.

Figure 11:
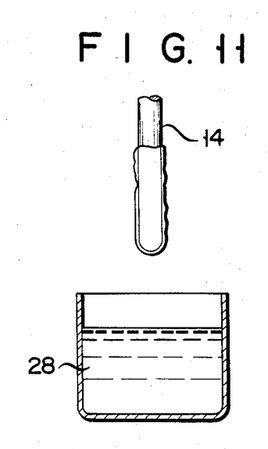
FIGS. 11-14 are views showing the various steps of chemical treatment according to the present invention.

2. Masking (1) As shown in FIG. 11, the capstan 14 is immersed in a masking solution (vinyl acetate) 28 to a point just below the rough surface part 27 and is taken out therefrom.

Figure 12:
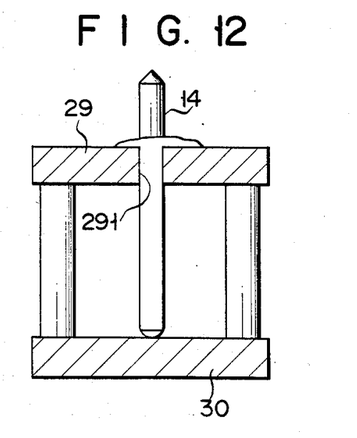

(2) As shown in FIG. 12, the capstan 14 is inserted into a through hole 291 of a masking jig 29 from the side which has been immersed in the masking solution 28 until it reaches a stopper 30 and is then pulled out while slowly rotating it.

Figure 13:
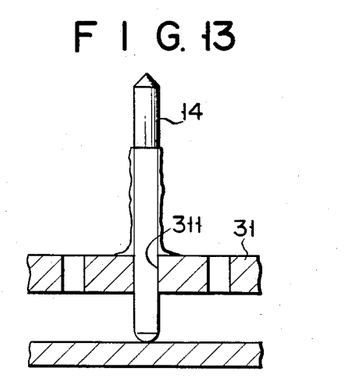

(3) The pulled capstan 14 is inserted into a through hole 311 of a drying jig 31, as shown in FIG. 13.

3. Drying

The capstan 14 is dried until it may not be dropped even if the drying jig 31 is supported up side down.

4. Chemical Porous Etching (CPE)

Figure 14:
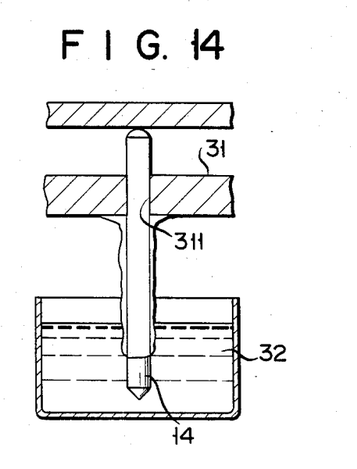

After drying, the rough surface part 27 of the capstan 14 is immersed in a C.P.L. (Chemical Polishing Liquid; trade name) which is a typical example of a hydrogen flyoride solution 32 to dissolve the iron component for 2 to 3 minutes, as shown in FIG. 14.

5. Rinsing with Water

6. Neutralization

After rinsing with water, the capstan 14 is immersed in a sodium carbonate solution for about 1 to 2 minutes for neutralization. Sodium carbonate (5 to 10 gr/l).

7. Rinsing with Water

8. Treatment with Chromic Acid

The part of the capstan 14 treated with CPL is immersed in a sodium dichromate solution (10 gr/l) at room temperature for one minute.

9. Rinsing with Water

10. Removal of Masking

The capstan 14 is pulled out of the drying jig 31 and the masking is removed with ethyl alcohol.

11. Drying

Figure 15:
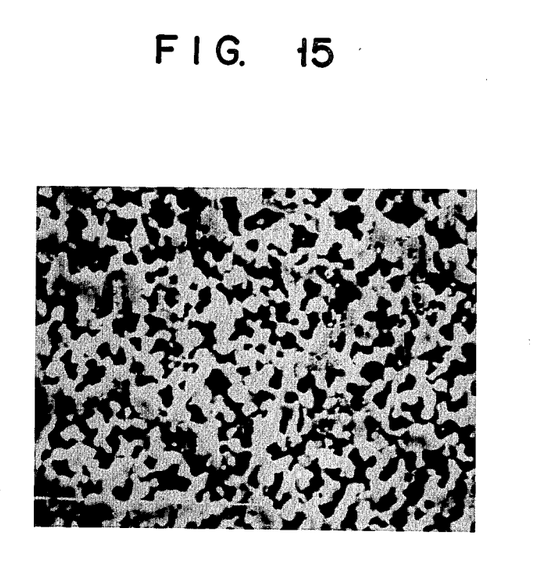
FIG. 15 is a microphotograph showing the surface of the cap stand after the chemical treatment.
Figure 16:
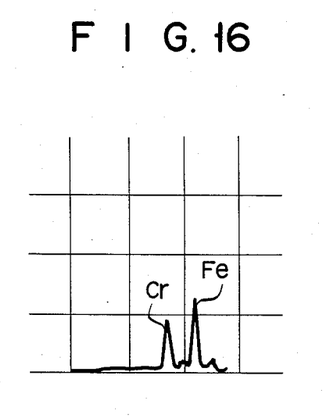
FIG. 16 is a characteristic graph showing the component ratio of iron and chrome after chemical treatment.

After the chemical treatment as described above, the surface of the capstan 14 becomes as shown in a photograph (1,000 magnification) in FIG. 15. The ratio of iron to chrome components is significantly decreased from that shown in FIG. 9 as seen in X-ray microanalyzer test results shown in FIG. 16.

In the embodiment described above, the tape drive member is the capstan 14. However, the tape drive member may be guiding members such as a tape guide roller.

The present invention is not limited to the embodiment described above, and various changes may be made within the spirit and scope of the present invention.

In summary, the present invention provides a tape drive member which is capable of driving a tape in a stable and reliable manner and which is excellent in durability, and a method for manufacturing the same.

We claim:

1. A tape drive member consisting essentially of an alloy of a soft metal material and a hard metal material, said member having an outer surface portion that is roughened by removing mainly said soft metal material to form projecting portions made of the hard metal material.

2. A tape drive member according to claim 1, wherein the outer surface portion which is roughened contains said soft metal material in a higher ratio than at any other portions thereof.

3. A tape drive member according to claim 1 or 2 wherein said alloy is an alloy containing iron, chrome and nickel as major components.

4. A method of manufacturing a tape drive member consisting essentially of an alloy of a soft metal material and a hard metal material, comprising the steps of:
   forming said member of said alloy substantially uniform; and
   etching an outer surface portion of said tape drive member to remove mainly said soft metal material of the outer surface portion to form projecting portions made of the hard metal material, thereby roughening the outer surface portion.

5. A method according to claim 4, wherein the step of forming said member comprises the step of forming said member of an alloy of iron, chrome and nickel as major components, and wherein said etching step comprises the step of chemically activating the outer surface portion of said tape drive member to cause a reaction with an acid and to dissolve mainly said iron component.

* * * * *